US 8,880,650 B2

(12) United States Patent
Hu et al.

(10) Patent No.: US 8,880,650 B2
(45) Date of Patent: Nov. 4, 2014

(54) SYSTEM AND METHOD FOR STORING STREAMING MEDIA FILE

(75) Inventors: Maowei Hu, Shenzhen (CN); Haijiang Luo, Shenzhen (CN); Xianfeng Yang, Shenzhen (CN)

(73) Assignee: Xunlei Networking Technologies, Ltd., Shenzhen (CN)

( * ) Notice: Subject to any disclaimer, the term of this patent is extended or adjusted under 35 U.S.C. 154(b) by 600 days.

(21) Appl. No.: 12/680,863

(22) PCT Filed: Oct. 20, 2008

(86) PCT No.: PCT/CN2008/001768
§ 371 (c)(1),
(2), (4) Date: May 24, 2010

(87) PCT Pub. No.: WO2009/062385
PCT Pub. Date: May 22, 2009

(65) Prior Publication Data
US 2010/0241757 A1    Sep. 23, 2010

(30) Foreign Application Priority Data

Oct. 23, 2007    (CN) .......................... 2007 1 0181569

(51) Int. Cl.
*G06F 15/16*    (2006.01)
*H04L 29/06*    (2006.01)
*H04N 21/218*    (2011.01)
*H04L 29/08*    (2006.01)
*H04N 21/845*    (2011.01)
*H04N 21/222*    (2011.01)
*H04N 21/231*    (2011.01)

(52) U.S. Cl.
CPC ................ *H04L 67/06* (2013.01); *H04L 65/80* (2013.01); *H04N 21/2181* (2013.01); *H04L 29/08729* (2013.01); *H04N 21/8456* (2013.01); *H04L 65/4084* (2013.01); *H04N 21/222* (2013.01); *H04N 21/23109* (2013.01)
USPC ......................................................... 709/219

(58) Field of Classification Search
CPC ............ H04L 65/4084; H04L 65/4076; H04L 65/605
USPC ................................................... 709/219, 231
See application file for complete search history.

(56) References Cited

U.S. PATENT DOCUMENTS 6,240,105 B1    5/2001    Zetts
6,859,840 B2 *  2/2005    Singal et al. .................. 709/232
(Continued)

FOREIGN PATENT DOCUMENTS

CN          1472963         2/2004
CN          1852283         10/2006
(Continued)

OTHER PUBLICATIONS

International Search Report for PCT/CN2008/001643 mailed Jan. 8, 2009; 4 pages.
(Continued)

*Primary Examiner* — Jason Recek
(74) *Attorney, Agent, or Firm* — Finnegan, Henderson, Farabow, Garrett & Dunner, LLP

(57) ABSTRACT

A system and method for storing a streaming media file for improving the performance of a streaming media server and fully utilizing the space of a storage are provided. The system includes: a segmenting and distributing server, adapted to segment the streaming media file into at least two segment files, determine a number of the streaming media servers for storing each segment file, distribute each of the at least two segment files to corresponding streaming media servers according to the determined number of the streaming media servers, and transmit the related information of each of the at least two segment files to a resource index server; at least two streaming media servers, adapted to receive and store the segment file; and the resource index server, adapted to receive the related information and establish an index in respect of each segment file and its related information.

18 Claims, 3 Drawing Sheets

(56) References Cited

U.S. PATENT DOCUMENTS

| | | | |
|---|---|---|---|
| 7,340,510 B1* | 3/2008 | Liskov et al. | 709/220 |
| 7,379,467 B1 | 5/2008 | Paul et al. | |
| 7,379,967 B2 | 5/2008 | Izutsu et al. | |
| 7,516,235 B2 | 4/2009 | Feig | |
| 7,584,292 B2 | 9/2009 | Bae et al. | |
| 7,716,321 B2 | 5/2010 | Dacosta | |
| 7,725,534 B2 | 5/2010 | Fishhaut | |
| 7,788,394 B2 | 8/2010 | Gregotski et al. | |
| 7,865,928 B2 | 1/2011 | Hostyn et al. | |
| 7,876,978 B2 | 1/2011 | Berger et al. | |
| 2002/0029282 A1* | 3/2002 | Buddhikot et al. | 709/231 |
| 2002/0046405 A1* | 4/2002 | Lahr | 725/87 |
| 2003/0031176 A1* | 2/2003 | Sim | 370/392 |
| 2004/0024900 A1* | 2/2004 | Breiter et al. | 709/231 |
| 2004/0210948 A1 | 10/2004 | Jin et al. | |
| 2005/0033856 A1* | 2/2005 | Li | 709/231 |
| 2005/0071496 A1* | 3/2005 | Singal et al. | 709/232 |
| 2005/0097085 A1* | 5/2005 | Shen et al. | 707/3 |
| 2005/0262253 A1* | 11/2005 | Li et al. | 709/231 |
| 2006/0212584 A1* | 9/2006 | Yu et al. | 709/227 |
| 2007/0100891 A1* | 5/2007 | Nee | 707/104.1 |
| 2007/0266169 A1* | 11/2007 | Chen et al. | 709/231 |
| 2008/0071907 A1* | 3/2008 | Thompson | 709/224 |
| 2008/0115170 A1* | 5/2008 | Ray et al. | 725/58 |
| 2008/0256326 A1* | 10/2008 | Patterson et al. | 711/206 |
| 2008/0270524 A1* | 10/2008 | Gupta et al. | 709/203 |
| 2008/0288537 A1* | 11/2008 | Golovchinsky et al. | 707/104.1 |
| 2008/0289023 A1* | 11/2008 | Wardrop | 726/9 |
| 2010/0299443 A1 | 11/2010 | Hu et al. | |

FOREIGN PATENT DOCUMENTS

| | | |
|---|---|---|
| CN | 1852431 | 10/2006 |
| CN | 1972441 | 5/2007 |

OTHER PUBLICATIONS

International Preliminary Examination Report for PCT/CN2008/001643 completed Mar. 30, 2010; 5 pages.

International Search Report for PCT/CN2008/001768 mailed Feb. 5, 2009; 4 pages.

International Preliminary Examination Report for PCT/CN2008/001768 issued Apr. 27, 2010; 6 pages.

* cited by examiner

SYSTEM AND METHOD FOR STORING STREAMING MEDIA FILE

CROSS-REFERENCE TO RELATED APPLICATIONS

The present application claims the benefit of priority to International Patent Application No. PCT/CN2008/001768 filed 20 Oct. 2008, which further claims the benefit of priority to Chinese patent Application No. 200710181569.2 filed 23 Oct. 2007, the contents of which are incorporated herein by reference in their entirety.

FIELD OF THE INVENTION

The present invention relates to the field of computer networks and communications, and in particular, to a system and method for storing a streaming media file.

BACKGROUND OF THE INVENTION

Streaming media refer to continuous audio or video data stream that may be transmitted and played in a temporal sequence on the network, and a streaming media system is a system providing a streaming media file of an audio or video content, and the streaming media file may be downloaded via the network and played by internet users.

Referring to FIG. 1, the streaming media system is mainly composed of two parts, i.e. a streaming media server and a streaming media client (i.e., a media player). The main function of the streaming media server is to collect, buffer, schedule and transmit the streaming media file. The streaming media client may be positioned at a local computer of the user and capable of downloading the streaming media file from the streaming media server according to a streaming media protocol and playing the streaming media file.

Currently, the streaming media system in the market mainly includes a live streaming media system and an on-demand streaming media system. The live streaming media system may provide the user with a real-time data transmission service, in which the user can neither arbitrarily change the playing progress nor watch certain contents at any time, and relatively low technical requirements are involved; while the on-demand streaming media system enables the user to select the interested content for playing from various contents provided by the system as desired, and change the play progress, however, the streaming media server needs to store a large number of audio or video contents that are available for the selection by the users, thus the technical requirements for the on-demand streaming media system are relatively high.

The streaming media server is of much significance in the streaming media system, since its performance and load have a direct effect on the playing effect at the streaming media client. Generally, a streaming media server configured with better hardware can serve more users. However, the streaming media server may encounter a bottleneck of the performance regardless the configuration of the server. That is, the system may be overloaded and the requests of the users cannot be responded in time, when a streaming media server capable of serving hundreds of users confronts requests of more users (such as thousands of users), as a result, the playing at the client may be frequently interrupted and unsmooth. Therefore, the performance of the streaming media server needs to be enhanced increasingly in terms of techniques.

Referring to FIG. 2, in the existing streaming media system, an entire streaming media file is stored as a basic unit, and the streaming media file is downloaded to a streaming media client by using a traditional downloading mode and then played by a media player. For a relatively small streaming media file, such as a small audio file or a video file with a short playing time and a low resolution, it is not problematic for the streaming media server to store the entire streaming media file as a basic unit. However, with the popularity of the broadband service and the increasingly high requirements of the user, more and more video files with a high resolution need to be provided for the numerous internet users via the streaming media system, and such video file with the high resolution generally corresponds to a relatively large file in the streaming media server.

It is found by the inventors that there exist the following disadvantages in the prior art.

(1) With the increase of the number of users and the enlargement of size of the streaming media files, the performance of the streaming media server deteriorates rapidly. When lots of streaming media files are stored on the streaming media server while the contents attracting the users are widely spread over the streaming media files, numerous streaming media files may be in an active status, and data of the streaming media files need to be exchanged frequently between the memory and the hard disk, leading to a performance bottleneck in the streaming media server, which is mainly presented by the I/O performance bottleneck, so that the requests of various users cannot be responded in time because of the delay due to the low speed of reading the streaming media files from the hard disk.

(2) Space of storage of the streaming media server is not fully utilized. The streaming media server has to store the entire streaming media file regardless of the popularity of the streaming media file. In fact, however, the user may be interested in only a little part of the contents of the streaming media files. For the most streaming media files, the users watch/listen only a little part of contents at the beginning of the streaming media files, and stop playing the media files if they are not of interests. Thus, most of the entire streaming media files stored on the streaming media server are actually not watched/listened by the users, thereby resulting in a waste of the space of the storage.

(3) The experience of the user degrades. For the most of streaming media files, the users watch/listen only a little part of contents at the beginning of the media files to determine whether the streaming media files are of interests, and therefore hope that the little part of contents at the beginning can be played rapidly and the buffer time may be decreased. However, with the increase of the number of the users and the enlargement of the size of the streaming media file, the performance of the streaming media server deteriorates rapidly, and the buffer time becomes longer, so that the user experience degrades.

SUMMARY OF THE INVENTION

Embodiments of the invention provide a system and method for storing a streaming media file, to improve the performance of a streaming media server and fully utilize the space of the storage.

The system according to an embodiment of the invention includes a segmenting and distributing server, a resource index server and at least two streaming media servers.

The segmenting and distributing server is adapted to segment the streaming media file into at least two segment files, determine a number of streaming media servers for storing each segment file, distribute each of the at least two segment files to corresponding streaming media servers according to the determined number of the streaming media servers, and transmit the related information of each of the at least two segment files to the resource index server.

The streaming media server is adapted to receive and store the segment file; and The resource index server is adapted to receive the related information and establish an index in respect of each segment file and its related information.

The method according to an embodiment of the invention includes:

segmenting a streaming media file into at least two segment files and determining a number of streaming media servers for storing each segment file; distributing and storing each of the at least two segment files to corresponding streaming media servers according to the determined number of the streaming media servers; and establishing an index in respect of each segment file and its related information.

In the embodiments of the invention, a streaming media file is segmented into at least two segment files, each of which is relatively small comparing with the corresponding streaming media file, each streaming media server stores less segment files and thus less space of the storage is occupied in the streaming media server in comparison with the case that each streaming media server has to store the entire streaming media file in the prior art. Thus, the streaming media server in the invention can cache the segment file completely in the memory, and when the user requests to download the segment file, the segment file can be read and downloaded directly from the memory, thereby avoiding the slow operation of reading files from the hard disk, eliminating the bottleneck of the I/O performance, improving the performance of the streaming media server, enhancing the utilization of the storage and fully utilizing the space of the storage.

DETAILED DESCRIPTION OF THE EMBODIMENTS

In order to improve the performance of a streaming media server, fully utilize the space of the storage and improve the user experience of playing the streaming media, embodiments of the invention provide a system and method for storing a streaming media file.

Figure 1:
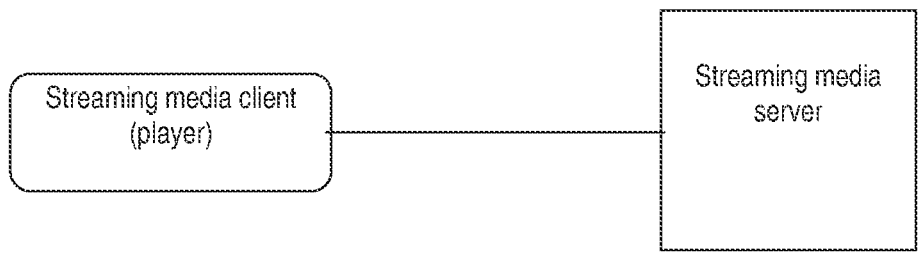
FIG. 1 is a first structural representation of an existing streaming media system.
Figure 2:
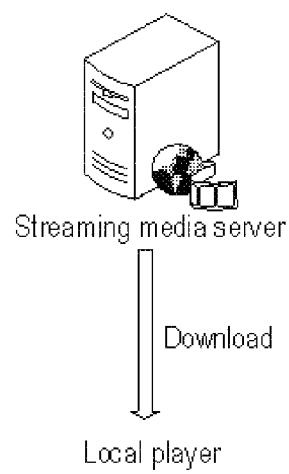
FIG. 2 is a second structural representation of an existing streaming media system.
Figure 3:
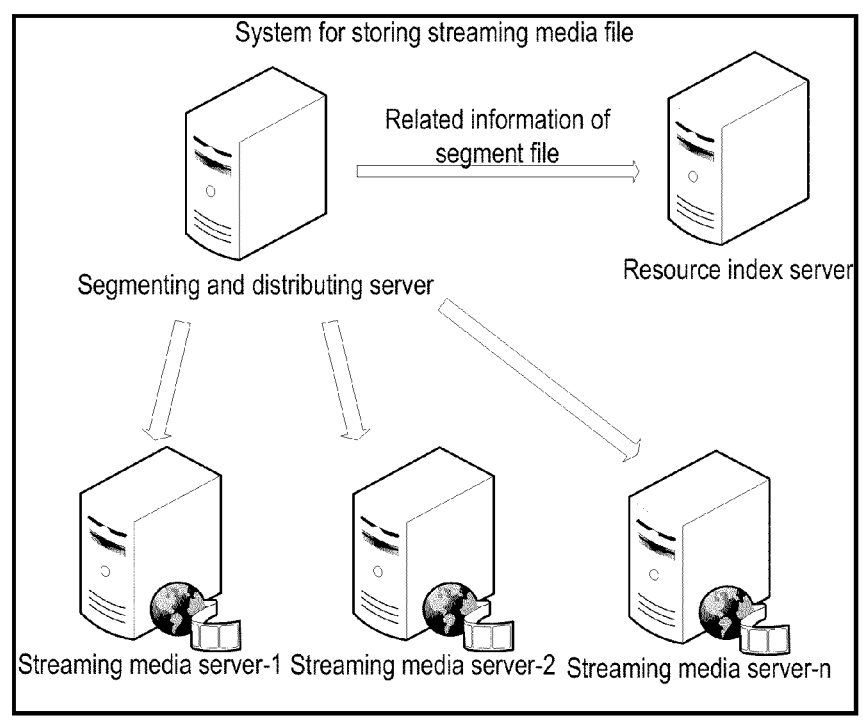
FIG. 3 is a first structural representation of a system for storing a streaming media file according to an embodiment of the invention.

FIG. 3 shows a system for storing a streaming media file according to an embodiment of the invention, and the system includes: a segmenting and distributing server, a resource index server and at least two streaming media servers.

Now the segmenting and distributing server is described in detail.

The segmenting and distributing server is adapted to segment the streaming media file into at least two segment files, determine a number of the streaming media servers for storing each segment file, distribute each of the at least two segment files to the corresponding streaming media servers according to the determined number of the streaming media servers, and transmit related information of each of the at least two segment files to the resource index server.

Specifically, the segmenting and distributing server may segment an entire streaming media file into a plurality of segment files according to a certain rule (e.g. according to size of the streaming media file or a boundary of frames of the streaming media file, but not limited to the size of the streaming media file or a boundary of frames of the streaming media file). The segment files are independent from each other, and can be recombined into the entire streaming media file.

The segmenting and distributing server respectively determines the number of the streaming media servers for storing each segment file, and determines a redundancy for distributing each segment file according to the popular degree of the segment file. The redundancy refers to the ratio of the size of all files allocated to the streaming media servers with respect to each segment file to the size of the segment file, that is, how many streaming media servers to which the segmenting and distributing server distributes each segment file.

The segmenting and distributing server can distribute the segment files flexibly depending on different requirements of the users. Given the fixed number of the streaming media servers in the system according to the embodiment of the invention, the segmenting and distributing server determines that the number of streaming media servers for storing a segment file with a high access frequency is larger than the number of streaming media servers for storing a segment file with a low access frequency; the segment file with the high access frequency is a segment file at the beginning part of the streaming media file and/or a segment file at the ending part of the streaming media file, the segment file with the low access frequency is a segment file at the middle part of the streaming media file. The segmenting and distributing server may distribute the segment files with a high access frequency with a larger redundancy; while the segmenting and distributing server may distribute the segment files with a low access frequency with a smaller redundancy. For example, the beginning segment file is distributed with the largest redundancy.

The segmenting and distributing server distributes each segment file to the corresponding streaming media servers, and transmits the related information of each segment file to the resource index server. The related information of each segment file includes: an identification of the segment file, an identification of the streaming media file corresponding to the segment file, an offset address of the segment file in the corresponding streaming media file, the length of the segment file and the addresses of all the streaming media servers storing the segment file.

Now the streaming media server and the resource index server are described.

The streaming media server is adapted to receive the segment files distributed by the segmenting and distributing server and store the segment files.

The resource index server is adapted to receive the related information of each segment file transmitted by the segmenting and distributing server, and establish an index in respect of each segment file and its related information.

Figure 4:
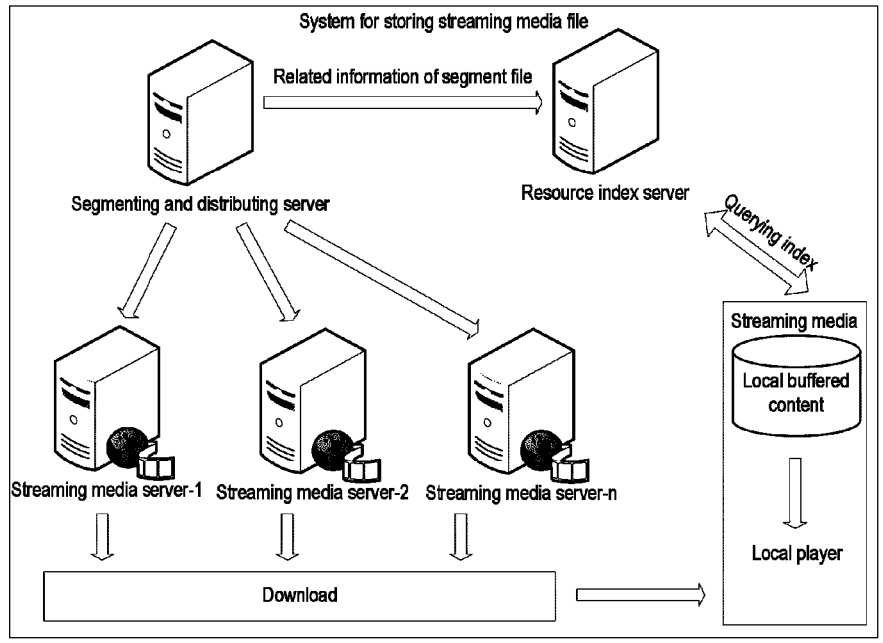
FIG. 4 is a second structural representation of a system for storing a streaming media file according to an embodiment of the invention.

Further, in order to improve the user experience, referring to FIG. 4, the system according to the embodiment of the invention may further include a streaming media client, which is adapted to determine the streaming media servers storing a target segment file via querying the index in the resource index server, and download the target segment file from the determined streaming media servers and play the downloaded target segment file.

Figure 5:
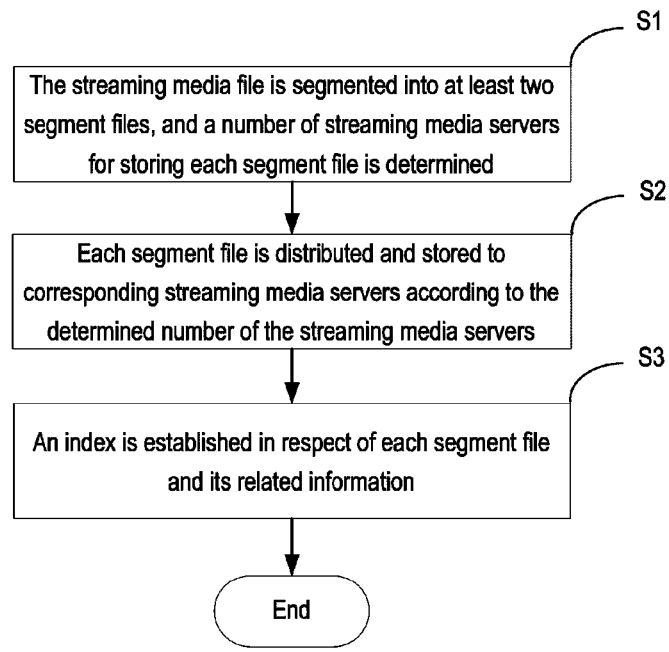
FIG. 5 is a flow chart of a method for storing a streaming media file according to an embodiment of the invention.

An embodiment of the invention further provides a method for storing a streaming media file, referring to FIG. 5, and the method includes the following.

S1: The streaming media file is segmented into at least two segment files, and the number of streaming media servers for storing each segment file is determined;

S2: Each of the at least two segment files is distributed to the corresponding streaming media servers according to the determined number of the streaming media servers and is stored in the streaming media servers; and S3: An index is established in respect of each segment file and its related information.

Further, in order to improve the user experience, the method according to an embodiment of the invention may further include: determining the streaming media servers storing a target segment file by querying the index, and downloading the target segment file from the determined streaming media servers and playing the target segment file.

Now the detailed description is made with reference to an embodiment (taking the system including a streaming media client as an example).

It is assumed that 10 streaming media servers providing the service are included in the system according to the embodiment.

In the segmenting process, for a relatively popular (not very popular) video file with a high resolution and a high access frequency, the size of the entire streaming media file is 800 M, the segmenting and distributing server may segment the streaming media file to 20 segment files according to the size of the streaming media file, with the average size of each segment file being 40 M. It should be noted when segmenting that the size of each segment file needs to be moderate, not too large or too small, for example, the size is preferably 10 M-50 M. In order to effectively improve the performance of the streaming media server, an entire streaming media file shall not be segmented if it is smaller than 50 M. Thus, compared with the entire streaming media file, the segment file appears to be small in size.

In the distributing and outputting process, the segmenting and distributing server distributes each segment file appropriately according to the access frequency of the segment file, i.e., the popular degree, thus enabling the load to be distributed to respective streaming media servers as evenly as possible, so that the performance of the streaming media server is improved; further, the segmenting and distributing server outputs the related information of the segment file.

For the beginning segment file of the streaming media file, it is relatively popular and has an access frequency much higher than that of other segment files other than the beginning segment file, and the user may hope to watch/listen the contents of the beginning segment file as quickly as possible to determine whether the entire streaming media file corresponding to the beginning segment file is of interest, therefore, the segmenting and distributing server distributes the beginning segment file with the largest redundancy of 10, that is, the beginning segment file is distributed to 10 streaming media servers. The request of the user for the beginning segment file can be responded quickly, thus reducing the time for the beginning segment file to buffer as much as possible to improve the user experience.

Since the video file is relatively popular and has a relatively high access frequency, the redundancy for distributing any segment file other than the beginning segment file may be set as 3 (theoretically, the redundancy may be 1, that is, the non-beginning segment file is distributed to one streaming media server, however, in practice, the distribution is generally performed with a redundancy of at least 2 considering the disaster tolerance and the reliability of the system), that is, the non-beginning segment file is distributed to 3 streaming media servers.

In this case, the total occupied space of the storage is (1*10+19*3)*40=2680 M, and the average space of the storage occupied by each streaming media server is 268 M, therefore, the utilization of the space of the storage is higher comparing with the case where the video file of a size of 800 M is stored on every streaming media server.

The result after the distribution is shown in Table 1.

TABLE 1

| Sequence number of server | Distribution status of segment file | Number of segment files |
|---|---|---|
| #1 | 1, 2, 3, 4, 5, 6, 7 | 7 |
| #2 | 1, 8, 9, 10, 11, 12, 13 | 7 |
| #3 | 1, 14, 15, 16, 17, 18, 19 | 7 |
| #4 | 1, 20, 2, 3, 4, 5, 6 | 7 |
| #5 | 1, 7, 8, 9, 10, 11, 12 | 7 |
| #6 | 1, 13, 14, 15, 16, 17, 18 | 7 |
| #7 | 1, 19, 20, 2, 3, 4, 5 | 7 |
| #8 | 1, 6, 7, 8, 9, 10 | 6 |
| #9 | 1, 11, 12, 13, 14, 15 | 6 |
| #10 | 1, 16, 17, 18, 19, 20 | 6 |

The segmenting and distributing server further transmits the related information of each segment file to the resource index server, and the related information of each segment file may include: an identification of the segment file, an identification of the streaming media file corresponding to the segment file, an offset address of the segment file in the corresponding streaming media file, the length of the segment file and the addresses of all the streaming media servers storing the segment file. The identification may be a unique name identification, such as a unique name identification formed by naming with a serial number. The identification may also be a corresponding identification obtained by calculating the data of the segment file and the streaming media file respectively by using a preset algorithm, such as the hash algorithm (including but not limited to the hash algorithm), for example the MD5 algorithm, where each identification is unique in principle and is generally referred to as a fingerprint identification. If a standard system such as a web server or an MMS (Multimedia Messaging Service) is used, the related information of the segment file may be identified by a corresponding plug-in programmed via the plug-in interface provided by the system, and then transmitted to the resource index server; if a customized system is used, a corresponding plug-in needs to be programmed separately to achieve the above object.

In the receiving and storing process, each streaming media server receives and stores the segment file distributed by the segmenting and distributing server. Referring to Table 1, according to the distribution of the embodiment, the streaming media server with the sequence number of 1 receives and stores seven segment files with sequence numbers of 1, 2, 3, 4, 5, 6, and 7; the streaming media server with the sequence number of 2 receives and stores seven segment files with sequence numbers of 1, 8, 9, 10, 11, 12, and 13, and so on.

The resource index server receives the related information of each segment file output by the segmenting and distributing server, and establishes an index in respect of each segment file and its related information, and the index may be queried subsequently. In the index of the embodiment, the related information corresponding to the beginning segment file includes: a fingerprint identification of the entire streaming media file having a size of 800 M, the corresponding offset address of the beginning segment file in the entire streaming media file having a size of 800 M, the length of the beginning segment file, and the addresses of the streaming media servers with the sequence numbers of 1, 2, 3, 4, 5, 6, 7, 8, 9, and 10. The related information of the other segment files may be deduced by analogy.

In the downloading and playing process, the streaming media client downloads the beginning segment file in the entire streaming media file having a size of 800 M in the embodiment. The user sends a request for downloading the beginning segment file to the resource index server via the streaming media client, the resource index server instructs the streaming media client to query the index in the resource index server in response to the request, and then the streaming media client obtains the related information corresponding to the beginning segment file from the index, determines the addresses of the streaming media servers with the sequence numbers of 1, 2, 3, 4, 5, 6, 7, 8, 9, and 10 storing the beginning segment file, downloads the beginning segment file from the 10 streaming media servers to a local buffer, and drives the player to play the beginning segment file.

In order to improve the download speed, the target segment file may be downloaded from the determined multiple streaming media servers simultaneously during the downloading. Since an entire streaming media file is segmented into a plurality of segment files, and each segment file is stored on at least two streaming media servers, the effect of enhancing the download speed may be achieved by downloading the target segment file from the at least two streaming media servers simultaneously, thus improving the user experience.

So far the above embodiment has been described.

Since the segment files are independent from each other, the segmenting and distributing server may distribute the segment files flexibly according to the different requirements of the uses. The ending segment file of the streaming media file, i.e., the last segment file after segmenting, may also be distributed with a relatively large redundancy by the segmenting and distributing server; and the segment files other than the beginning and ending segment files may also be distributed with a relatively large redundancy according to the different requirements of the users.

In summary, the advantageous effects obtained by the embodiments of the invention are described below.

(1) The performance of the streaming media server is improved.

Since an entire streaming media file is segmented into a plurality of segment files, each of which is relatively small comparing with the corresponding entire streaming media file, and each streaming media server stores less segment files, less space of the storage is occupied in comparison with the case that each streaming media server has to store the entire streaming media file in the prior art, thus the streaming media server can cache the segment file completely in the memory. When the user requests to download the segment file, the segment file can then be read and downloaded directly from the memory, thereby avoiding the slow operation of reading the segment file from the hard disk, eliminating the bottleneck of the I/O performance, and improving the performance of the streaming media server.

(2) The space of the storage can be fully utilized.

Since the segment file is relatively small comparing with the entire streaming media file, and each segment file is distributed and stored depending on its access frequency, each streaming media server stores less segment files, and less space of the storage is occupied in comparison with the case that each streaming media server has to store the entire streaming media file in the prior art, thus enhancing the utilization of the hard disk and fully utilizing the space of the storage.

(3) The user experience is improved.

The buffer time for playing the streaming media file is a key factor that influences the user experience. Since the performance of the streaming media server is improved and the beginning segment file with the highest access frequency is distributed with the largest redundancy, so that the buffer time for playing the streaming media file by the user is decreased, and hence the user experience can be improved.

It should be stated that the above embodiments are merely to illustrate but not limit the technical solution of the present invention. While the present invention has been elaborately described with reference to the preferable embodiments, it will be appreciated by one skilled in the art that it is possible to modify the technical solutions described in the above embodiments, or replace a part of the technical features with equivalent one without departing from the spirit and scope of the present invention.

The invention claimed is:

1. A system for storing a streaming media file, comprising:
a segmenting and distributing server;
a resource index server, wherein the resource index is implemented on a single computer; and
at least two streaming media servers;
wherein the segmenting and distributing server is adapted to:
segment the streaming media file into at least two segment files;
determine for each segment file a number of the streaming media servers for storing the segment file based on a temporal position of the segment file within the streaming media file, wherein the segmenting and distributing server is adapted to determine that the number of streaming media servers for storing a segment file at a beginning or ending temporal position is larger that the number of streaming media servers for storing a segment file at a middle temporal position;
distribute each of the at least two segment files to corresponding streaming media servers according to the determined number of the streaming media servers; and
transmit the related information of each of the at least two segment files to the resource index server;
wherein each of the streaming media server is adapted to receive and store one or more segment files distributed by the segmenting and distributing server; and
wherein the resource index server is adapted to receive the related information transmitted by the segmenting and distributing server for each of the at least two segment files and establish an index in respect of each segment file and its related information.

2. The system of claim 1, wherein, the related information for each segment file of the at least two segments files comprises: an identification of the segment file, an identification of the streaming media file corresponding to the segment file, an offset address of the segment file within the corresponding streaming media file, the length of the segment file and the addresses of all the streaming media servers storing the segment file.

3. The system of claim 2, wherein the identification of the segment file is obtained by calculating the data of the segment file using a preset algorithm.

4. The system of claim 2, wherein the identification of the streaming media file is obtained by calculating data of the streaming media file using a preset algorithm.

5. The system of claim 1, wherein the segmenting and distributing server is adapted to distribute a beginning segment file of the streaming media file to all the streaming media servers and distribute one or more other segment files of the streaming media file to fewer than all of the streaming media servers.

6. The system of claim 1, wherein the segmenting and distributing server is adapted to distribute each of the at least two segment files to at least two streaming media servers.

7. The system of claim 1, further comprising: a streaming media client, adapted to determine the streaming media servers storing a target segment file by querying the resource index server, download the target segment file simultaneously from the determined streaming media servers, and play the downloaded target segment file.

8. The system of claim 1, wherein the segmenting and distributing server is adapted to segments the streaming media file into at least two segment files according to size of the streaming media file or a boundary of frames of the streaming media file.

9. The system of claim 1, wherein the resource index server is further adapted to:
receive from a client a query of the index of a segment file, wherein the segment file is stored on two or more streaming media servers; and
return to the client information indicating each of the two or more streaming media servers on which the segment file is stored, wherein the information enables the client to download the segment file from each of the two or more streaming media servers.

10. The system of claim 1, wherein the segmenting and distributing server is adapted to:
determine an accumulated number of segment files to be distributed by accumulating the number of the streaming media servers for storing each segment file; and
distribute the accumulated number of segment files to the streaming media servers such that a total number of segment files distributed to each streaming media server is substantially the same.

11. A method for storing a streaming media file, comprising:
segmenting the streaming media file into at least two segment files;
determining for each segment file a number of streaming media servers for storing each segment file based on a temporal position of the segment file within the streaming media file, wherein said determining includes determining that the number of streaming media servers for storing a segment file at a beginning or ending temporal position is larger that the number of streaming media servers for storing a segment file at a middle temporal position;
distributing and storing each of the at least two segment files to corresponding streaming media servers according to the determined number of the streaming media servers; and
transmitting related information for each of the at least two segment files to a resource index server, wherein the resource index server is implemented on a single computer; and
establishing on the resource index server an index in respect of each segment file and its related information.

12. The method of claim 11, wherein the related information of each segment file comprises: an identification of the segment file, an identification of the streaming media file corresponding to the segment file, an offset address of the segment file within the corresponding streaming media file, the length of the segment file, and the addresses of all the streaming media servers storing the segment file.

13. The method of claim 12, wherein the identification of the segment file is obtained by calculating the data of the segment file using a preset algorithm.

14. The method of claim 12, wherein the identification of the streaming media file is obtained by calculating data of the streaming media file using a preset algorithm.

15. The method of claim 11, comprising distributing a beginning segment file of the streaming media file to all the streaming media servers and distributing one or more other segment files of the streaming media file to fewer that all of the streaming media servers.

16. The method of claim 11, comprising distributing each of the at least two segment files to at least two streaming media servers.

17. The system of claim 11, further comprising: determining the streaming media servers storing a target segment file by querying the resource index server, downloading the target segment file simultaneously from each of the determined streaming media servers and playing the target segment file.

18. The method of claim 11, wherein segmenting the streaming media file into at least two segment files comprises:
segmenting the streaming media file into at least two segment files according to size of the streaming media file or a boundary of frames of the streaming media file.

* * * * *